US012764216B2

(12) United States Patent
Ng

(10) Patent No.: US 12,764,216 B2
(45) Date of Patent: Oct. 13, 2026

(54) PROTECTIVE FRAME FOR MOBILE PHONE CAMERA

(71) Applicant: Casetagram Limited, Hong Kong (HK)

(72) Inventor: Pui Sun Wesley Ng, Hong Kong (HK)

(73) Assignee: Casetagram Limited, Hong Kong (HK)

( * ) Notice: Subject to any disclaimer, the term of this patent is extended or adjusted under 35 U.S.C. 154(b) by 231 days.

(21) Appl. No.: 18/804,153

(22) Filed: Aug. 14, 2024

(65) Prior Publication Data

US 2025/0063114 A1 Feb. 20, 2025

Related U.S. Application Data

(60) Provisional application No. 63/582,836, filed on Sep. 14, 2023.

(30) Foreign Application Priority Data

Aug. 15, 2023 (CN) ......................... 202322198336.0

(51) Int. Cl.

| | |
|---|---|
| ***H04M 1/04*** | (2006.01) |
| ***A45C 11/00*** | (2006.01) |
| ***A45C 13/00*** | (2006.01) |
| ***A45C 13/04*** | (2006.01) |
| ***H04M 1/02*** | (2006.01) |

(52) U.S. Cl.

CPC ............... *H04M 1/04* (2013.01); *A45C 11/00* (2013.01); *A45C 13/001* (2013.01); *A45C 13/005* (2013.01); *A45C 13/04* (2013.01); *H04M 1/0264* (2013.01); *A45C 11/002* (2025.01); *A45C 2200/15* (2013.01)

(58) Field of Classification Search

None

See application file for complete search history.

(56) References Cited

U.S. PATENT DOCUMENTS

| | | | | |
|---|---|---|---|---|
| 2019/0253886 | A1* | 8/2019 | Lee ........................ | H04M 1/185 |
| 2024/0162930 | A1* | 5/2024 | Monco ................. | H04B 1/3888 |

* cited by examiner

*Primary Examiner* — Steven Lim

(57) ABSTRACT

The present invention provides a protective frame for phone camera, including: a lower frame fixedly mountable on a phone case; and an upper frame connected to the lower frame through a hinge structure including: a shaft positioning block; a shaft sleeve; a pair of shaft brackets; and a first pivot shaft. The shaft sleeve has a positioning strip and the hollow channel has a positioning groove coupled to the positioning strip such that the shaft sleeve can be assembled in the hollow channel in a quickly detachable manner. A front end of the pivot shaft is configured to pass through at least one shaft hole of the shaft brackets and inserted into an axial channel of the shaft sleeve by means of transition fit such that the upper frame is rotatable while capable to maintain a stable state when being flipped at a desired angle relative to the lower frame.

15 Claims, 5 Drawing Sheets

PROTECTIVE FRAME FOR MOBILE PHONE CAMERA

CROSS-REFERENCE TO RELATED APPLICATIONS

The present application claims priority from the Chinese Utility Model Patent Application No. 2023221983360 filed on 15 Aug. 2023 and U.S. Provisional Application No. 63/582,836 filed on 14 Sep. 2023. The disclosures of which are incorporated herein by reference in their entireties.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to mobile phone case. More specifically the present invention relates to a protective frame installable on a camera lens window of a mobile phone case facing the lens of the mobile phone to protect the camera lens.

BACKGROUND OF THE INVENTION

Mobile phones have become so popular that everyone owns one. Mobile phones can facilitate people to learn, work, shop and consume, and browse beautiful scenery and customs of the world.

Nowadays, when people are traveling, outing in the suburbs, or reading and studying, the camera or video function of the mobile phone is playing a crucial role. Therefore, special attention must be paid to protect the mobile phone camera lens. At present, many mobile phones are equipped with a protective frame on the mobile phone camera lens. When the phone is placed on a table with the lens facing the table, the protective frame can act as a spacer so that the table will not touch the lens, thus ensuring that the lens will not be scratched by the table surface. In addition, in order to make it easier for the owner to tilt and support the mobile phone on the table when using the mobile phone, some protective frames include upper and lower frames connected together through a hinged structure. The lower frame is assembled on the mobile phone or mobile phone case, and the upper frame can be flipped up relative to the lower frame about the hinge axis so that the phone can be inclinedly supported on the table.

Although existing camera lens protection frame has the above-mentioned advantages, it still has the following shortcomings:

1. The hinge structure is complex in design and inconvenient to install. The lower frame is first fixed on the mobile phone or mobile phone case with screws, and the upper frame and the lower frame are connected through a shaft to form the complex hinge structure. See the Chinese utility model patent "Multifunctional Mobile Phone Case" (application number: 202122301096.3, grant issuance number: CN 215897797U).

2. When the upper frame is used as a bracket to support the mobile phone, the stability is usually poor due to the single-axis hinge structure. The angle between the upper frame and the lower frame may be easily altered by even a slight touch.

SUMMARY OF THE INVENTION

The technical problem to be solved by present invention is how to provide a protective frame for a mobile phone camera lens that can be quickly assembled on a mobile phone case and stably secured in a configured state when used to support the mobile phone.

In accordance with a first aspect of the present invention, a protective frame for mobile phone camera is provided. The protective frame includes: a lower frame fixedly mountable on a mobile phone case; and an upper frame connected to the lower frame through a hinge structure. The protective frame is characterized in that: the hinge structure includes: a shaft positioning block arranged on the lower frame, and having a hollow channel extending through and along a longitudinal direction of the shaft positioning block; a shaft sleeve having an axial channel; a pair of shaft brackets arranged on the upper frame, each having a shaft hole; and a first pivot shaft having a front end; wherein the shaft sleeve further has a positioning strip protruded from its outer circumferential wall and the hollow channel has a positioning groove recessed from its inner circumferential wall, the positioning groove being configured to couple to the positioning strip such that the shaft sleeve can be assembled in the hollow channel in a quickly detachable manner; and wherein the front end of the first pivot shaft is configured to pass through at least one of the shaft holes and inserted into the axial channel by means of transition fit such that the upper frame is rotatable about the hinge structure while capable to maintain a stable state when the upper frame is flipped relative to the lower frame at a desired angle to act as a supportive stand for positioning the phone.

In one embodiment, the lower frame has four sides including: a lower frame inner side forming part of the hinged structure, a lower frame outer side opposite to the lower frame inner side, a first lower frame lateral side connecting a first end of the lower frame inner side to a first end of the lower frame outer side, and a second lower frame lateral side connecting a second end of the lower frame inner side to a second end of the lower frame outer side; and the lower frame further includes at least one clip-shaped fastener arranged on a bottom surface of each of the four sides, configured to couple with a corresponding edge of a lens window of the mobile phone case such that when the lower frame is pressed fit into the mobile phone case, the clip-shaped fasteners are fastened and invertedly clipped on the edges of the lens window respectively to allow the lower frame to be quickly installed on the mobile phone case.

In one embodiment, the upper frame has four sides including: an upper frame inner side forming part of the hinged structure, an upper frame outer side opposite to the upper frame inner side, a first upper frame lateral side connecting a first end of the upper frame inner side to a first end of the upper frame outer side, and a second upper frame lateral side connecting a second end of the upper frame inner side to a second end of the upper frame outer side. The protective frame further includes: a pair of protruded step surfaces arranged on the first and second lower frame lateral side top surfaces respectively; and a pair of recessed step surfaces arranged on the first and second upper frame lateral side bottom surfaces; and each protruded step surface is configured to overlap vertically with a corresponding recessed step surface to form a seamless joint.

In one embodiment, the protective frame further includes: a first magnetic coupling element arranged on a bottom surface of the upper frame outer side; and a second magnetic coupling element arranged on a top surface of the lower frame outer side; and the first and second magnetic coupling elements are mutually attracted to each other.

In one embodiment, the shaft positioning block is formed on a top surface of the lower frame inner side and integrated with the lower frame to form an integral piece.

In one embodiment, that the pairs of shaft brackets are formed on a bottom surface of the upper frame inner side and integrated with the upper frame to form an integral piece.

In one embodiment, the first pivot shaft includes an anti-slip structure arranged on an outer circumferential wall of an exposed end of the first pivot shaft.

In one embodiment, the lower and upper frames are made of metals, metal alloys or hard plastics.

In one embodiment, the axial channel is a through-hole or a blind hole.

In one embodiment, the protective frame further includes indentation gap formed between the outer sides of the lower frame and upper frame when the protective case is at a closed state.

In one embodiment, the hinge structure further includes a second pivot shaft having a front end, each of the front ends of the first and second pivot shafts is configured to pass through a corresponding shaft hole and inserted into the axial channel.

In one embodiment, each of the first and second pivot shafts include an anti-slip structure arranged on an outer circumferential wall of an exposed end of the first and second pivot shafts.

In accordance with a second aspect of the present invention, a mobile phone case including the protective frame is provided.

In one embodiment, the mobile phone case includes a back surface with a layer of heterogeneous material disposed thereon.

In one embodiment, the layer of heterogeneous material includes a specular reflective material.

DETAILED DESCRIPTION

Figure 1:
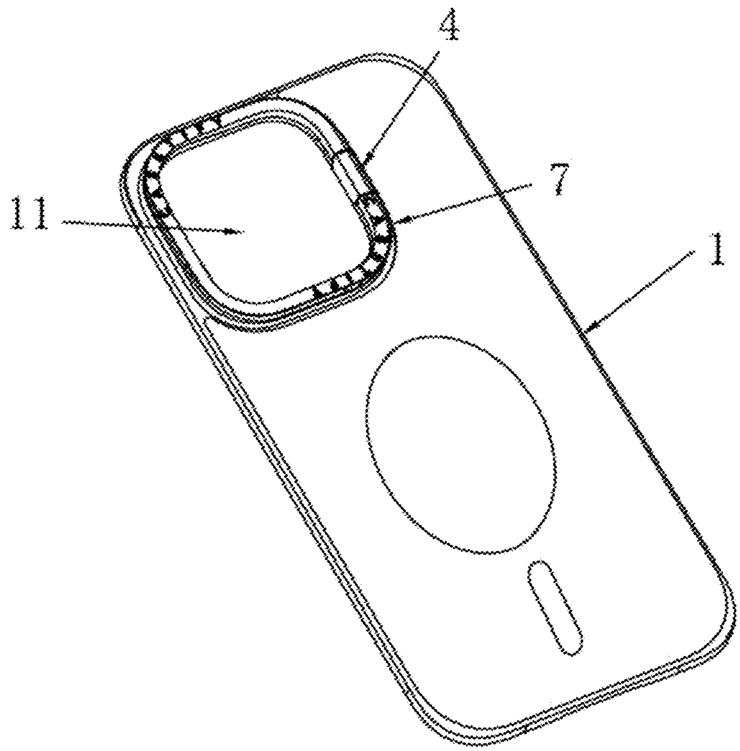
FIG. 1 is a schematic diagram of the phone case implemented with a protective frame according to one embodiment of the present invention.
Figure 2:
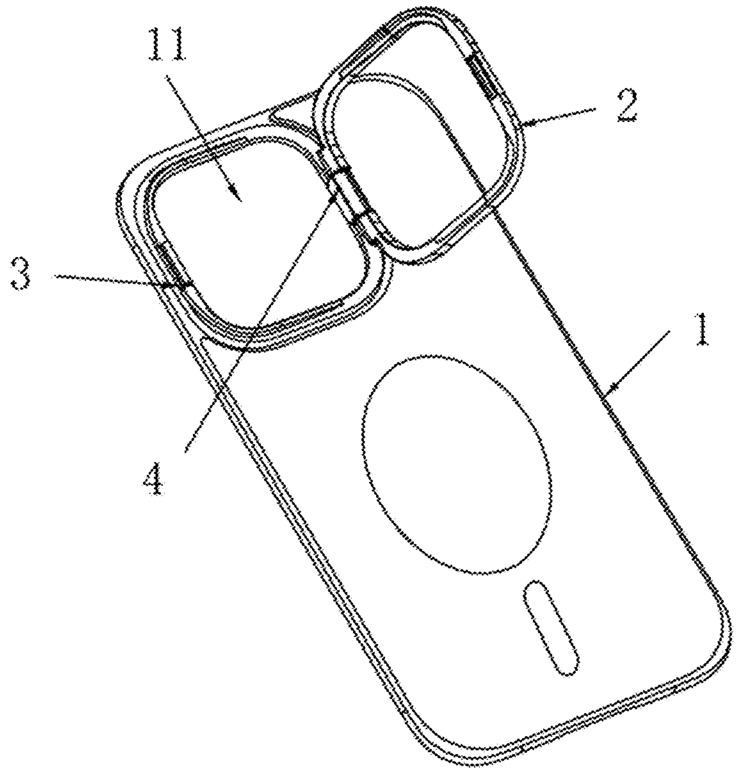
FIG. 2 is a schematic diagram of an upper frame of the protective frame in FIG. 1 when opened at an obtuse angle.
Figure 3:
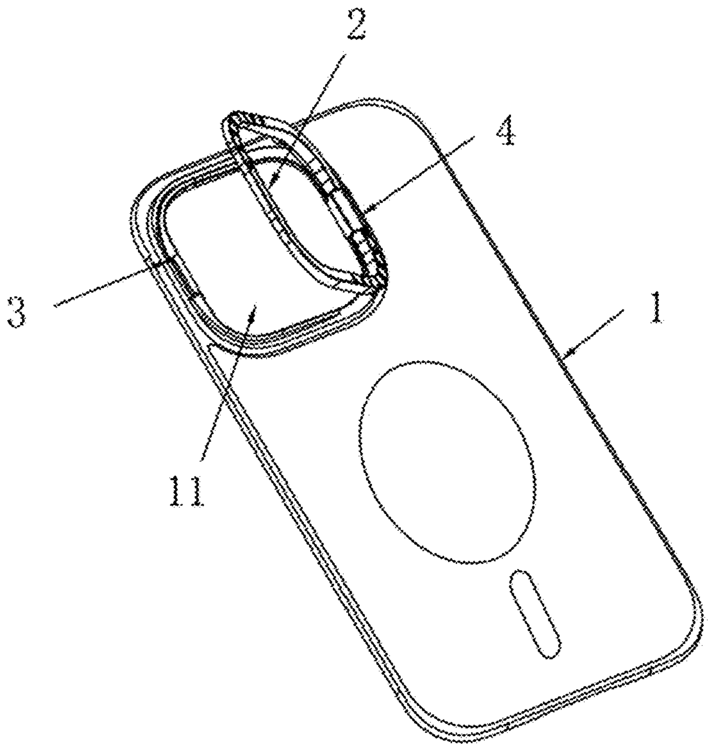
FIG. 3 is a schematic diagram of the upper frame of the protective frame in FIG. 1 when opened at an acute angle.
Figure 4:
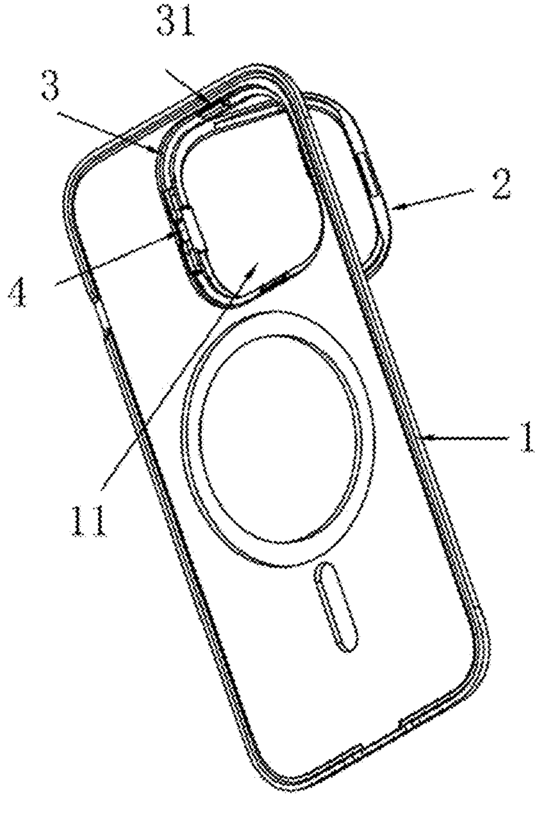
FIG. 4 is a rear view of FIG. 3.

As shown in FIGS. 1 to 6, the protective frame for the mobile phone camera lens in the present invention is installed on the phone case 1 (the protective shell covering the back of the phone) directly above the through-hole designated for the phone camera lens (also known as the lens window) 11.

The protective frame includes lower frame 3, upper frame 2, and hinge structure 4 connecting the lower frame 3 to the upper frame 2. The lower frame 3 and upper frame 2 are made of metal or hard plastic, preferably aluminum alloy material. The external color is preferably black.

Each of the upper frame 2 and lower frame 3 is a rectangular frame with a central opening precisely aligned with the phone camera lens window 11.

The upper frame 2 has four sides including: an upper frame inner side 201 defined as the side forming part of the hinged structure 4, an upper frame outer side 202 opposite to the inner side, a first upper frame lateral side 203 connecting a first end of the upper frame inner side to a first end of the upper frame outer side, and a second upper frame lateral side 204 connecting a second end of the upper frame inner side to a second end of the upper frame outer side.

Each of the four sides of the upper frame 2 has a top surface defined as the surface distal from the phone and a bottom surface defined as the surface proximal to the phone. Accordingly, the upper frame inner side 201 has an upper frame inner side top surface and an upper frame inner side bottom surface; the upper frame outer side 202 has an upper frame outer side top surface and an upper frame outer side bottom surface; the first upper frame lateral side 203 has a first upper frame lateral side top surface and a first upper frame lateral side bottom surface; and the second upper frame lateral side 204 has a second upper frame lateral side top surface and a second upper frame lateral side bottom surface.

Similarly, the lower frame 3 has four sides including: a lower frame inner side 301 defined as the side forming part of the hinged structure 4, a lower frame outer side 302 opposite to the inner side, a first lower frame lateral side 303 connecting a first end of the lower frame inner side to a first end of the lower frame outer side, and a second lower frame lateral side 304 connecting a second end of the lower frame inner side to a second end of the lower frame outer side.

Each of the four sides of the lower frame 3 has a top surface defined as the surface distal from the phone and a bottom surface defined as the surface proximal to the phone. Accordingly, the lower frame inner side has a lower frame inner side top surface and a lower frame inner side bottom surface; the lower frame outer side has a lower frame outer side top surface and a lower frame outer side bottom surface; the first lower frame lateral side 303 has a first lower frame lateral side top surface and a first lower frame lateral side bottom surface; and the second lower frame lateral side 304 has a second lower frame lateral side top surface and a second lower frame lateral side bottom surface.

The lower frame 3 further includes at least one clip-shaped fastener arranged on the bottom surface of each side of the lower frame 3 and configured to couple with a corresponding edge of the lens window 11. During installation, the lower frame 3 is aligned with the lens window 11 and pressed downward, causing the bottom edge of the lower frame 3 to snugly fit against the external surface of the phone case 1, and the clip-shaped fasteners 31 is tighten laterally and caused to clip onto an inner surface of the lens window 11 under a lateral rebound force (here, the inner face of the lens window is referred to the surface of the phone case 1 that interfaces with the phone). As such, the lower frame 3 can be quickly and easily attached to the phone case 1. By applying a lateral force to the clip-shaped fasteners 31 towards the center of the lens window 11, the clip-shaped fasteners are released from the inner surface of the lens window 11 such that the lower frame 3 can be lifted upward from the lens window 11.

The lower frame 3 further includes a shaft positioning block 32 arranged on the lower frame inner side top surface. The shaft positioning block 32 is an upward-extending protrusion, and preferably forms an integral structure with the lower frame 3. The shaft positioning block 32 has a hollow channel 33 passing through the shaft positioning block 32 and extending along a longitudinal direction of the shaft positioning block. The hollow channel 33 may has a circular or polygonal shape. The circular hollow channel 33 include an inner wall having a positioning groove 34 recessed radially outward. Similar to the hollow channel 33, the positioning groove 34 passes through the shaft positioning block 32 and extending along a longitudinal direction of the shaft positioning block 32.

To achieve a close and compact fit between the upper frame 2 and the lower frame 3 when they are stacked together (i.e., when the protective frame is closed), the protective frame may further include a protruded step surface 35 on each of the first and second lower frame lateral side top surfaces; and a recessed step surface on each of the first and second upper frame lateral side bottom surfaces (not explicitly shown in the diagram). Specifically, each of the first and second lower frame lateral side top surfaces has an outer edge and an inner edge, wherein the outer edge is slightly lower than the inner edge. Each of the first and second upper frame lateral side bottom surfaces has an outer edge and an inner edge, wherein the outer edge is slightly lower than the inner edge. (Here, the edge closer to the center of the lower frame is considered the inner edge, and the edge farther away from the center of the lower frame is considered the outer edge.) As such, each pair of the inwardly recessed step surface of the upper frame 2 and outwardly protruded step surface 35 of the lower frame 3 form a seamless joint when then are overlapped vertically. Simultaneously, this structure effectively prevents the upper frame 2 from misalignment or deformation in case there is an accidental or unintended external force applied on the protective frame along the optical axis of the mobile phone camera lens.

To prevent any unintended opening of the protective frame when it is at closed state, the protective frame may further include a first magnetic coupling element arranged on the upper frame outer side bottom surface and a second magnetic coupling element arranged on the lower frame outer side top surface, and wherein the first and second magnetic coupling elements are mutually attracted to each other.

To facilitate lifting and opening of the upper frame 2 from the closed position on the lower frame 3 by hand, an indentation gap (not shown in the diagram) may be formed between the outer sides of the lower frame 3 and upper frame 2 when they are closed. In one embodiment, the indentation gap is a small gap having a length of approximately 3 mm-6 mm formed when the inwardly recessed step surface of the upper frame 2 is joined with the outwardly protruded step surface 35 of the lower frame 3.

The thickness of the inner side of the lower frame 3 is slightly smaller than the thickness of the outer side of the lower frame 3, and the inner side is streamlined to the first and second lateral sides respectively. This design has the following advantages: firstly, it enhances aesthetics; secondly, when placing the shaft positioning block 32 on the lower frame inner side top surface, the effective height at the inner side of the lower frame 3 (i.e., the sum of inner side thickness and the thickness of the shaft positioning block 32) is reduced; thirdly, it frees up space for the installation and rotation of the shaft brackets 22 of the upper frame 2.

The upper frame 2 includes a notch 21 configured to accommodate the shaft positioning block 32. The upper frame 2 further includes a shaft bracket 22 on each side of the notch 21, with an axial channel (or shaft holes 23) extending along an axial direction of the shaft brackets and having a length of no less than 2 millimeters. The shaft brackets 22 are preferably integrated with the upper frame 2 to form an integral structure and extending outward from an outer surface of the upper frame inner side. In other words, the top surfaces of the shaft brackets 22 form the upper frame inner side top surface. This design has several advantages: firstly, it positions the openings of the shaft holes 23 on both sides of the upper frame 2, facilitating the insertion of a single pivot shaft 6 as shown in FIG. 5 or a pair of pivot shafts 6 as shown in FIG. 6; secondly, when closing the upper frame 2 and lower frame 3 or flipping up the upper frame 2, the rotation of the hinge structure is not obstructed.

The top surfaces of the four sides of the upper frame 2 are in the same plane. Moreover, the first and second upper frame top surfaces are reserved areas intended for engraving or printing the product logo (product identification or logo).

Figure 5:
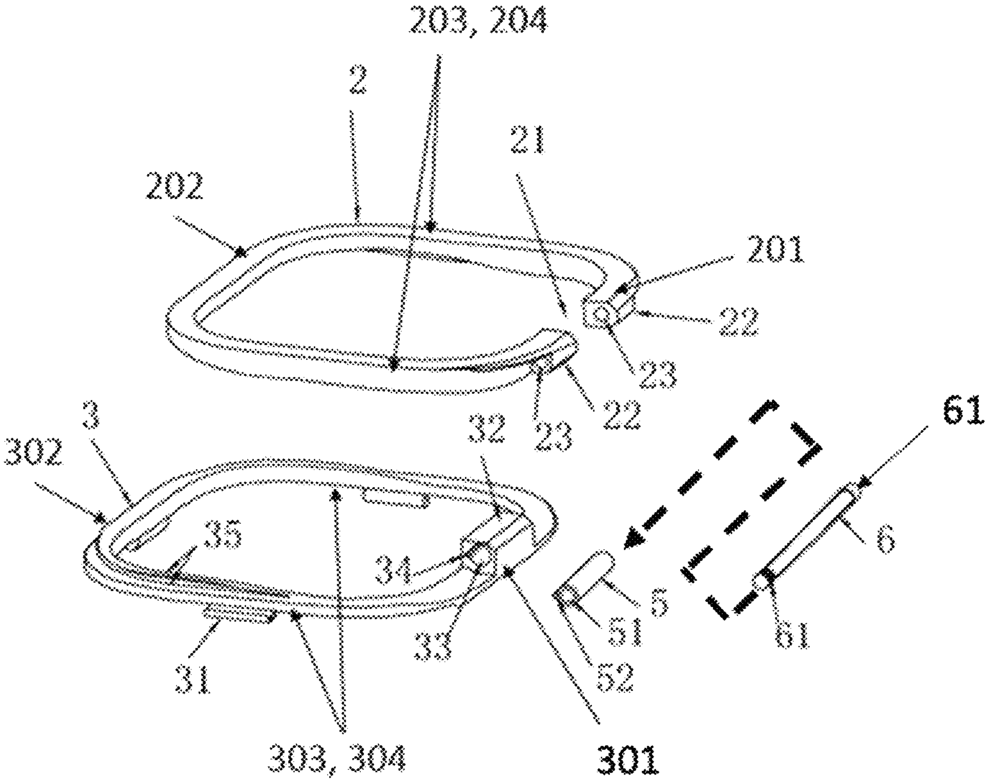
FIG. 5 is an exploded enlarged schematic diagram of the protective frame in FIG. 1 according to one embodiment of the present invention.
Figure 6:
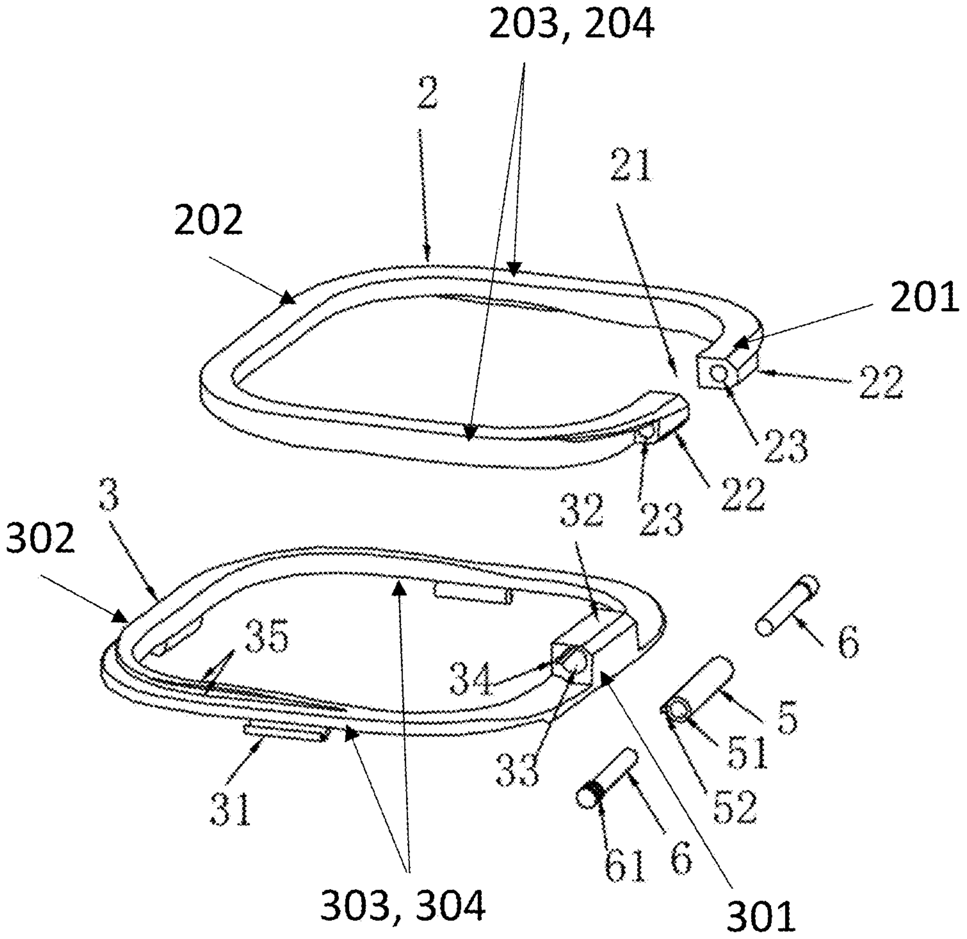
FIG. 6 is an exploded enlarged schematic diagram of the protective frame in FIG. 1 according to another embodiment of the present invention.

The hinge structure 4 includes the above-said shaft positioning block 32, shaft brackets 22, shaft sleeve 5, and a single pivot shaft 6 as shown in FIG. 5 or a pair of pivot shafts 6 as shown in FIG. 6.

When the cross-sectional shape of the hollow channel 33 on the shaft positioning block 32 is circular, correspondingly, the cross-sectional shape of the shaft sleeve 5 (the length of the shaft sleeve 5 is matched with, preferably equal to, the length of the hollow channel 33) is also circular. The shaft sleeve 5 includes an outer circumferential wall having a positioning strip 52. When the shaft sleeve 5 is inserted into the hollow channel 33 in the shaft positioning block 32, the positioning strip 52 fits into the positioning groove 34 on the inner wall of the hollow channel 33 to form a snug connection. This ensures the rapid installation of the shaft sleeve 5 on the shaft positioning block 32 and prevents relative rotation between the shaft sleeve 5 and the shaft positioning block 32.

The shaft sleeve 5 further includes an axial channel 51 extending along its axis, which can be a through-hole or a blind hole. The inner diameter of the axial channel 51 is essentially the same as the outer diameter of the pivot shaft(s) 6, both being circular and having clearances of transition fit. When the pivot shaft(s) 6 is inserted into the axial channel 51, there is a sliding friction connection between the outer wall of the pivot shaft(s) 6 and the inner wall of the axial channel 51, allowing for relative rotation when external torque is applied to the pivot shaft(s) 6 or the shaft sleeve 5. Once the torque is removed, the pivot shaft(s) 6 and the axial channel 51 is stabilized in a relatively stationary state due to the constraint of friction. Similarly, the part of the pivot shaft(s) 6 in contact with the inner wall of the shaft hole 23 also forms a sliding friction connection with the inner wall of the shaft hole 23. Therefore, when flipping the upper frame 2 upward, no matter the upper frame 2 rotates with the pivot shaft(s) 6 inside the axial channel 51 or the upper frame 2 rotates around the pivot shaft(s) 6, the upper frame 2 will not automatically (i.e., unintendedly) rotate after releasing the manually applied torque. In other words, the upper frame 2 will remain stable in the set position.

To facilitate holding the pivot shaft(s) 6 and pushing the same through the shaft hole 23 on the corresponding shaft bracket 22 into the hollow channel 33 on the shaft positioning block 32, the pivot shaft(s) 6 may include an anti-slip structure 61 arranged on an outer circumferential wall of an exposed end of the pivot shaft(s) 6.

Figure 7:
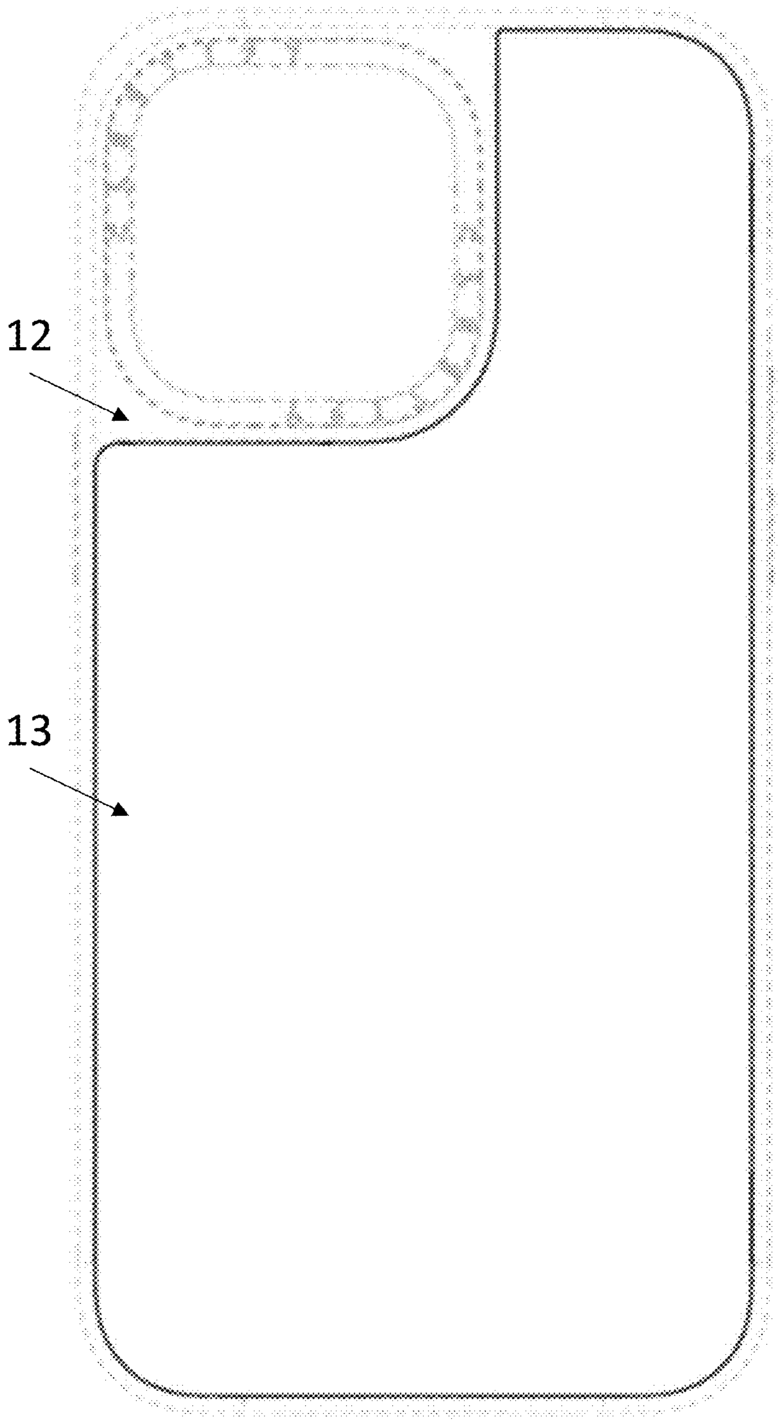
FIG. 7 is schematic diagram of a back surface of the phone case implemented with the protective frame.

As shown in FIG. 7, the phone case 1 includes a back surface 12 (the protective frame is omitted from the figure for simplicity). A layer of heterogeneous material 13 may be disposed on the back surface 12. The layer of heterogeneous material 13 may include but not limited to a specular reflective material, a plastic material, a metallic material, a silicone material, a thermochromic material, or a combination thereof.

The layer of heterogenous material 13 may be in the form of a sheet, a pad, or applied as a layer of coating at least partially covering the back surface 12 of the phone case 1.

A method of using the protective frame includes:

1) Firstly, inserting the shaft sleeve 5 into the hollow channel 33 of the shaft positioning block 32;
2) Aligning the shaft brackets 22 of the upper frame 2 with the shaft positioning block 32;
3) Then, pushing the single pivot shaft 6 from one side of the upper frame 2 into one of the shaft holes 23 of the shaft frame 22 as shown in FIG. 5, or pushing the pair of pivot shafts 6 from both sides of the upper frame 2 into the shaft holes 23 of the shaft frame 22 as shown in FIG. 6, and pushing forward continuously such that a front end of the pivot shaft(s) 6 passes through the shaft hole 23 and is inserted into the axial channel 51 in the shaft sleeve 5, the upper frame 2 and the lower frame 3 are quickly installed together.
4) When it is required to close the upper frame 2 and the lower frame 3 together, holding the outer side of the upper frame 2 and pressing it downward; when it is required to open the upper frame 2 from the closed state and make the upper frame 2 form an angle with the lower frame 3, flip the upper frame 2 upward though the indentation gap (e.g. by inserting a fingernail into the gap). When having an angle with the lower frame 3, the upper frame 2 can be used as a support bracket to tilt the mobile phone (in this case, the force exerted by the mobile phone on the upper frame 2 is less than the friction force between the pivot shafts 6 and the shaft sleeve 5).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A protective frame for mobile phone camera, comprising:

a lower frame fixedly mountable on a mobile phone case; and an upper frame connected to the lower frame through a hinge structure;

wherein the hinge structure comprises:

a shaft positioning block arranged on the lower frame, and having a hollow channel extending through and along a longitudinal direction of the shaft positioning block;

a shaft sleeve having an axial channel;

a pair of shaft brackets arranged on the upper frame, each having a shaft hole; and a first pivot shaft having a front end;

wherein the shaft sleeve further comprises a positioning strip protruded from its outer circumferential wall and the hollow channel has a positioning groove recessed from its inner circumferential wall, the positioning groove being configured to couple to the positioning strip such that the shaft sleeve can be assembled in the hollow channel in a detachable manner; and wherein the front end of the first pivot shaft is configured to pass through at least one of the shaft holes and inserted into the axial channel by means of transition fit such that the upper frame is rotatable about the hinge structure while capable to maintain a stable state when the upper frame is flipped relative to the lower frame at a desired angle to act as a supportive stand for positioning the phone.

2. The protective frame according to claim 1, wherein:

the lower frame has four sides comprising: a lower frame inner side forming part of the hinged structure, a lower frame outer side opposite to the lower frame inner side, a first lower frame lateral side connecting a first end of the lower frame inner side to a first end of the lower frame outer side, and a second lower frame lateral side connecting a second end of the lower frame inner side to a second end of the lower frame outer side; and the lower frame further comprises at least one clip-shaped fastener arranged on a bottom surface of each of the four sides, configured to couple with a corresponding edge of a lens window of the mobile phone case such that when the lower frame is pressed fit into the mobile phone case, the clip-shaped fasteners are fastened and invertedly clipped on the edges of the lens window respectively.

3. The protective frame according to claim 2, wherein:

the upper frame has four sides including: an upper frame inner side forming part of the hinged structure, an upper frame outer side opposite to the upper frame inner side, a first upper frame lateral side connecting a first end of the upper frame inner side to a first end of the upper frame outer side, and a second upper frame lateral side connecting a second end of the upper frame inner side to a second end of the upper frame outer side;

the protective frame further comprises:

a pair of protruded step surfaces arranged on the first and second lower frame lateral side top surfaces respectively; and a pair of recessed step surfaces arranged on the first and second upper frame lateral side bottom surfaces; and each protruded step surface is configured to overlap vertically with a corresponding recessed step surface to form a seamless joint.

4. The protective frame according to claim 3, wherein:

the protective frame further comprises:

a first magnetic coupling element arranged on a bottom surface of the upper frame outer side; and a second magnetic coupling element arranged on a top surface of the lower frame outer side; and the first and second magnetic coupling elements are mutually attracted to each other.

5. The protective frame according to claim 3, wherein the shaft positioning block is formed on a top surface of the lower frame inner side and integrated with the lower frame to form an integral piece.

6. The protective frame according to claim 3, wherein the pairs of shaft brackets are formed on a bottom surface of the upper frame inner side and integrated with the upper frame to form an integral piece.

7. The protective frame according to claim 1, wherein the first pivot shaft comprises an anti-slip structure arranged on an outer circumferential wall of an exposed end of the first pivot shaft.

8. The protective frame according to claim 1, wherein the lower and upper frames are made of metals, metal alloys or hard plastics.

9. The protective frame according to claim 1, wherein the axial channel is a through-hole or a blind hole.

10. The protective frame according to claim 1, wherein the protective frame further comprises indentation gap formed between the outer sides of the lower frame and upper frame when the protective case is at a closed state.

11. The protective frame according to claim 1, wherein the hinge structure further comprises a second pivot shaft having a front end, each of the front ends of the first and second pivot shafts is configured to pass through a corresponding shaft hole and inserted into the axial channel.

12. The protective frame according to claim 11, wherein each of the first and second pivot shafts comprise an anti-slip structure arranged on an outer circumferential wall of an exposed end of the first and second pivot shafts.

13. A mobile phone case comprising the protective frame according to claim 1.

14. The mobile phone case according to claim 13, wherein the mobile phone case comprises a back surface with a layer of heterogeneous material disposed thereon.

15. The mobile phone case according to claim 14, wherein the layer of heterogeneous material comprises a specular reflective material.

* * * * *